(12) United States Patent
Borkenhagen et al.

(10) Patent No.: US 6,760,856 B1
(45) Date of Patent: Jul. 6, 2004

(54) PROGRAMMABLE COMPENSATED DELAY FOR DDR SDRAM INTERFACE USING PROGRAMMABLE DELAY LOOP FOR REFERENCE CALIBRATION

(75) Inventors: John Michael Borkenhagen, Rochester, MN (US); James Anthony Marcella, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 09/617,558

(22) Filed: Jul. 17, 2000

(51) Int. Cl.$^7$ ............................................. G06F 13/42
(52) U.S. Cl. ...................... 713/401; 327/262; 327/270; 365/194
(58) Field of Search ................................ 327/262, 270; 713/401; 365/194

(56) References Cited

U.S. PATENT DOCUMENTS

| | | | | |
|---|---|---|---|---|
| 5,087,842 A | * | 2/1992 | Pulsipher et al. | 327/270 |
| 5,281,874 A | * | 1/1994 | Sorrells et al. | 327/269 |
| 6,242,959 B1 | * | 6/2001 | Stern | 327/262 |
| 6,316,980 B1 | * | 11/2001 | Vogt et al. | 327/273 |
| 6,369,670 B1 | * | 4/2002 | Rowell | 333/139 |
| 6,442,102 B1 | * | 8/2002 | Borkenhagen et al. | 365/233 |

* cited by examiner

*Primary Examiner*—Thomas Lee
*Assistant Examiner*—Albert Wang
(74) *Attorney, Agent, or Firm*—Joan Pennington

(57) ABSTRACT

A programmable compensated delay for a double data rate (DDR) synchronous dynamic random access memory (SDRAM) interface is provided. A programmable compensated delay apparatus includes a reference delay calibration circuit for providing a measured number of delay elements in one cycle. A programmable delay register provides a desired delay value. A conversion logic is coupled to the reference delay calibration circuit and the programmable delay register for receiving both the measured number of delay elements in one cycle and the desired delay value. The conversion logic provides a number of required delay elements. A delay circuit is coupled to the conversion logic for receiving the number of required delay elements and providing the desired delay. A SDRAM control logic provides a refresh start signal to the reference delay calibration circuit for updating the delay circuit during each DRAM refresh. The DQS clock strobe on the DDR SDRAM is applied to the delay circuit and is delayed by the desired delay.

16 Claims, 4 Drawing Sheets

PROGRAMMABLE COMPENSATED DELAY FOR DDR SDRAM INTERFACE USING PROGRAMMABLE DELAY LOOP FOR REFERENCE CALIBRATION

FIELD OF THE INVENTION

The present invention relates generally to the data processing field, and more particularly, relates to a programmable compensated delay for a double data rate (DDR) synchronous dynamic random access memory (SDRAM) interface.

DESCRIPTION OF THE RELATED ART

DDR SDRAM use a source synchronous interface for reading and writing data. The source synchronous clock strobe on DDR SDRAM is named DQS. When data is read from a DDR SDRAM, the DQS clock strobe is driven by the SDRAM. The SDRAM edge aligns the DQS clock strobe with the data. It is the responsibility of the device receiving SDRAM read data to delay the incoming DQS and center the incoming DQS in the middle of the incoming data. Strobe centering relative to data is required to handle skew uncertainty between the DQS and data coming out of the SDRAM, as determined by the SDRAM specification. It is also required to handle skew uncertainty created by card wiring, card loading, and inter-signal interference (ISIS). Lastly, DQS centering is required to support the data latch setup and hold times.

When DDR interfaces are operated at high frequencies, tight tolerance is required for the circuitry used to implement the delay of DQS. A common method to account for process variation effects on DQS delay between different manufactured chips is to calibrate DQS delay at system startup time. Temperature and voltage also affect delay. Temperature and voltage can dynamically change during system operation. A common method to compensate for temperature and voltage fluctuations is to continually calibrate the DQS delay.

A need exists for an improved mechanism to implement the delay of DQS. It is desirable to provide such an improved mechanism to implement the delay of DQS that effectively compensates for temperature and voltage fluctuations during system operation.

SUMMARY OF THE INVENTION

A principal object of the present invention is to provide a programmable compensated delay for a double data rate (DDR) synchronous dynamic random access memory (SDRAM) interface. Other important objects of the present invention are to provide such programmable compensated delay for a double data rate (DDR) synchronous dynamic random access memory (SDRAM) interface substantially without negative effect and that overcomes many of the disadvantages of prior art arrangements.

In brief, a programmable compensated delay for a double data rate (DDR) synchronous dynamic random access memory (SDRAM) interface is provided. A programmable compensated delay apparatus includes a reference delay calibration circuit for providing a measured number of delay elements in one cycle. A programmable delay register provides a desired delay value. A conversion logic is coupled to the reference delay calibration circuit and the programmable delay register for receiving both the measured number of delay elements in one cycle and the desired delay value. The conversion logic provides a number of required delay elements. A delay circuit is coupled to the conversion logic for receiving the number of required delay elements and providing the desired delay.

In accordance with features of the invention, a SDRAM control logic provides a refresh start signal to the reference delay calibration circuit for updating the delay circuit during each DDRAM refresh. The DQS clock strobe on the DDR SDRAM is applied to the delay circuit and delayed by the desired delay.

BRIEF DQSCRIPTION OF THE DDRAWINGS

The present invention together with the above and other objects and advantages may best be understood from the following detailed description of the preferred embodiments of the invention illustrated in the drawings, wherein.

DETAILED DQSCRIPTION OF THE PREFERRED EMBODIMENTS

Figure 1:
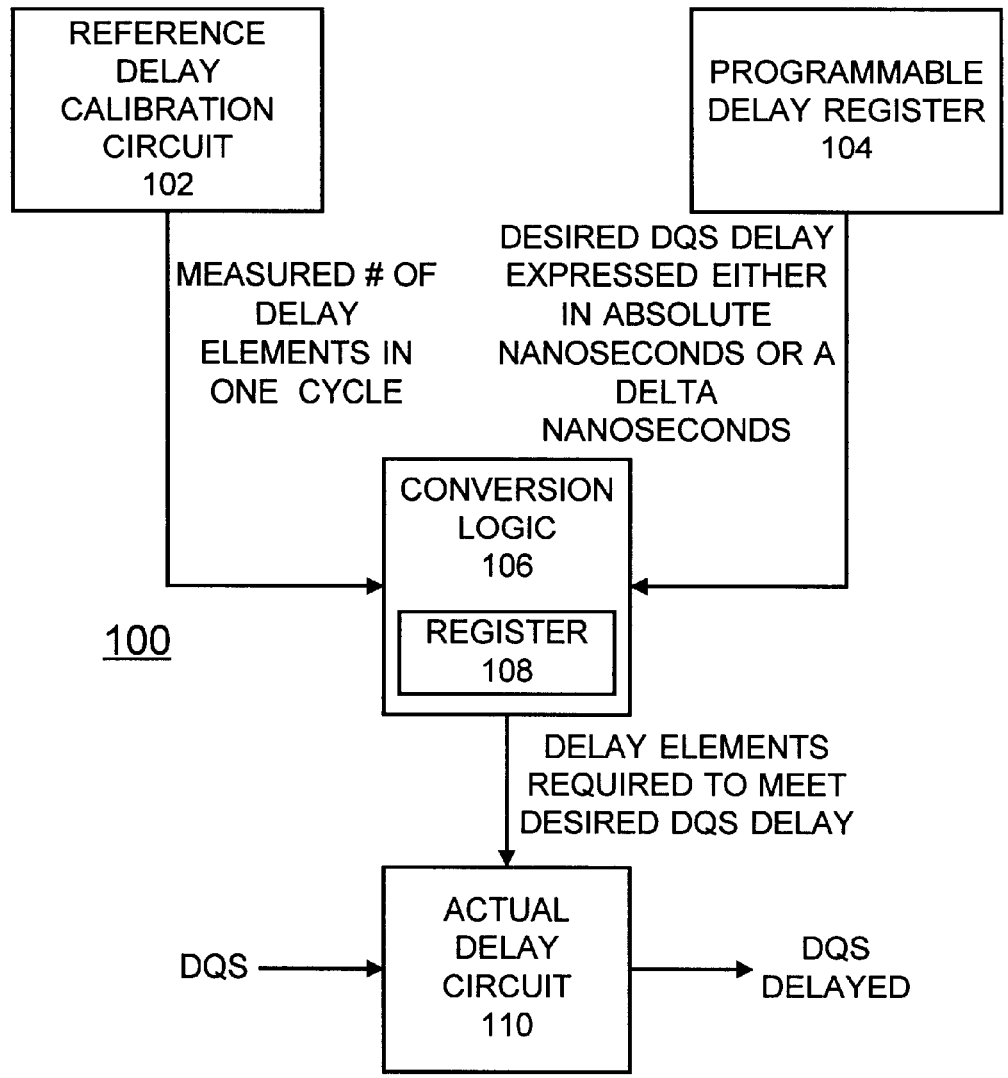
FIG. 1 is a block diagram representation illustrating a programmable compensated delay apparatus in accordance with the preferred embodiment.

Having reference now to the drawings, in FIG. 1, there is shown a programmable compensated delay apparatus in accordance with the preferred embodiment generally designated by the reference character 100. Programmable compensated delay apparatus 100 includes a reference delay calibration circuit 102, a programmable delay register 104, a conversion logic 106 and an actual delay circuit 110.

In accordance with features of the preferred embodiment, programmable compensated delay apparatus 100 supports programming a desired delay value for DQS form a selectable range of delays. An original delay setting for DQS is obtained from SDRAM read timing analysis using timing run output information on a pre-fabricated design. Programmable compensated delay apparatus 100 provides the capability to program a delay value allowing for adjustments based on measured results for the DQ data and DQS strobe on actual hardware. Programmable compensated delay apparatus 100 is implemented to provide delay compensation for process, temperature, and voltage variations. The delay selection is programmable to any value in increments as small as the smallest delay unit available in the circuit technology. DQS delay updates are done in a manner that results in no impact to system performance.

The programmable delay register 104 is used to set the desired delay value. The conversion logic 106 receives information from both the reference delay calibration circuit 102 and the programmable delay register 104 and outputs control information that is latched into a register 108 to control the actual delay circuit 110. The reference delay calibration circuit 102 is illustrated and described with respect to FIG. 2. The actual delay circuit 110 is illustrated and described with respect to FIG. 3.

Figure 2:
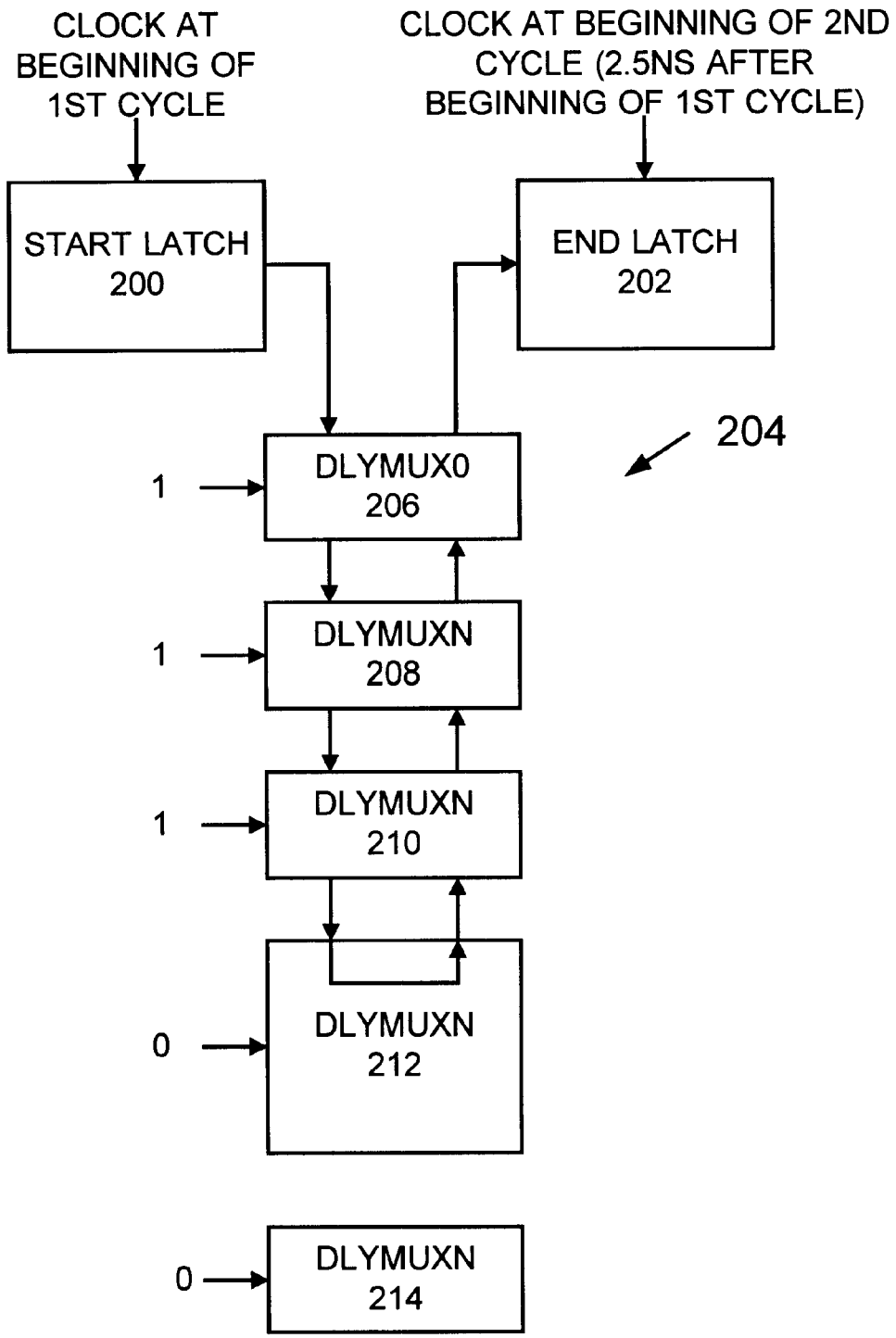
FIG. 2 is a block diagram representation illustrating a reference delay circuit of the programmable compensated delay apparatus of FIG. 1 in accordance with the preferred embodiment.

Referring also to FIG. 2, there is shown a block diagram representation illustrating the reference delay calibration circuit 102 of the programmable compensated delay apparatus 100 in accordance with the preferred embodiment. Reference delay calibration circuit 102 includes a start latch 200, an end latch 202 and a delay chain 204 including a programmable number of delay books 206, 208, 208, 210, 212, 214 between the start latch 200 and the end latch 202. Reference delay calibration circuit 102 operates at the maximum frequency available in the circuit design. Operating the reference delay calibration circuit 102 at the maximum frequency available minimizes the circuit area used by the delay elements 206, 208, 208, 210, 212, 214. There must be enough delay books 206, 208, 208, 210, 212, 214 between the start latch 200 and the end latch 202 so there is a delay greater than or equal to the cycle time with best case process, temperature, and voltage conditions. Zeros and ones are alternately sent down the delay chain 204.

At power-on initialization, no delay elements are programmed into the reference delay calibration circuit 102. One delay element is added to the delay chain 204 each cycle until that when a one is latched in the start latch 200, a zero is latched in the end latch 202 one cycle later. At this point, the reference delay chain 204 is longer than one cycle. When a zero is latched in the end latch 202, one delay element is removed each cycle until a one is latched in the end latch 202 one cycle after a one is latched in the start latch 200. The process of adding and removing delay books continuously repeats. This ensures the delay in the chain 204 of delay elements or books 206, 208, 208, 210, 212, 214 is centered around one cycle of delay. A binary representation of the number of delay elements 206, 208, 208, 210, 212, 214 in the reference delay chain 204 is applied to the conversion logic 106. The conversion logic 106 generates a value used to control the delay in the actual DQS delay circuit 110.

The delay in the reference delay chain 204 is not composed entirely of delay elements 206, 208, 208, 210, 212, 214. The reference delay chain 204 additionally includes a latch delay for the start latch 200 and a latch setup time for the end latch 202. Depending on the actual implementation, there may be other additional delay components in addition to the standard delay elements. In order to calculate the actual delay value contributed by each delay element 206, 208, 208, 210, 212, 214, it is necessary to account for the extra components of delay. If desired, the reference delay calibration circuit 102 can be altered to remove the parasitic delay components. The alternate design requires the reference delay chain length to be increased to support two clock cycles of delay. After a measurement is made to determine how many delay elements 206, 208, 208, 210, 212, 214 plus parasitic delay are in one cycle, a second measurement is made in a similar manner to determine how may additional delay elements are required in the delay chain for two full cycles of delay. The delay for the second cycle will be composed entirely of delay elements. This method provides even more accuracy, at the expense of extra logic and control complexity.

Delay multiplexers (muxes) are used for the delay elements 206, 208, 210, 212, 214. The last delay element in the chain is the first mux with its input control set to 0 so that its forward input is routed to its return output, such as mux 212 as shown in FIG. 2. This last delay element 212 has a delay of one-half the delay of the other delay elements 206, 208, 210. The number of delay elements or muxes 206, 208, 210, 212, 214 in the reference chain 204 is measured to be the number of delay elements or muxes 206, 208, 210 with their control set to 1 so that their return output is fed by their return input. The sum of the delay of the start latch 200, the set up delay of the end latch 202 and the delay of the last mux 212 is roughly equal to 3 delay element or muxes. The conversion equation used in an implementation to determine the value stored in register 108 for the DQS delay control is:

$$((Reference_{13}\ Value+3) * Ratio-0.5)$$

where $Reference_{13}$ Value is the number of delay element in the reference chain 204 with control set to 1;+3 is used to account for the sum of the delay of the start latch 200, the set up delay of the end latch 202 and the delay of the last mux 21; Ratio is the ratio of desired delay value to cycle time used in reference delay; and −0.5 is used to adjust for the end mux delay required in the DQS delay chain 110.

The programmable delay register 104 is written by software, normally at power-on initialization time. The value written into the register can be a binary representation of the desired delay value, or a binary representation of an offset from the cycle time that results in the desired delay value.

Conversion logic 106 inputs the binary representation of the number of delay elements in the reference delay chain 204 and the binary representation of the desired delay value or offset from the reference delay chain. The conversion logic 106 is implemented as a VHDL table. The conversion logic 106 can be implemented using standard combinational logic equations. The output of the conversion logic table 106 is latched into register 108 each time refresh is executed on the DDRAMs and used to control the actual delay chain used for DQS. Updating the register 108 at DDRAM refresh time is done to prevent updating the delay chain during an SDRAM read and creating a glitch on DQS.

It should be understood that the DQS delay could be updated more frequently, for example, any time not reading or even at forced intervals. More frequent updates are not required because the period between refreshes is much less than the thermal time constant of the control chip. Updating the DQS delay chain 110 control register 108 during refresh results in no impact to system performance. This is in contrast to a design that does updates outside of refresh where SDRAM read activity would have to be inhibited during the update of the DQS delay chain control register.

Figure 3:
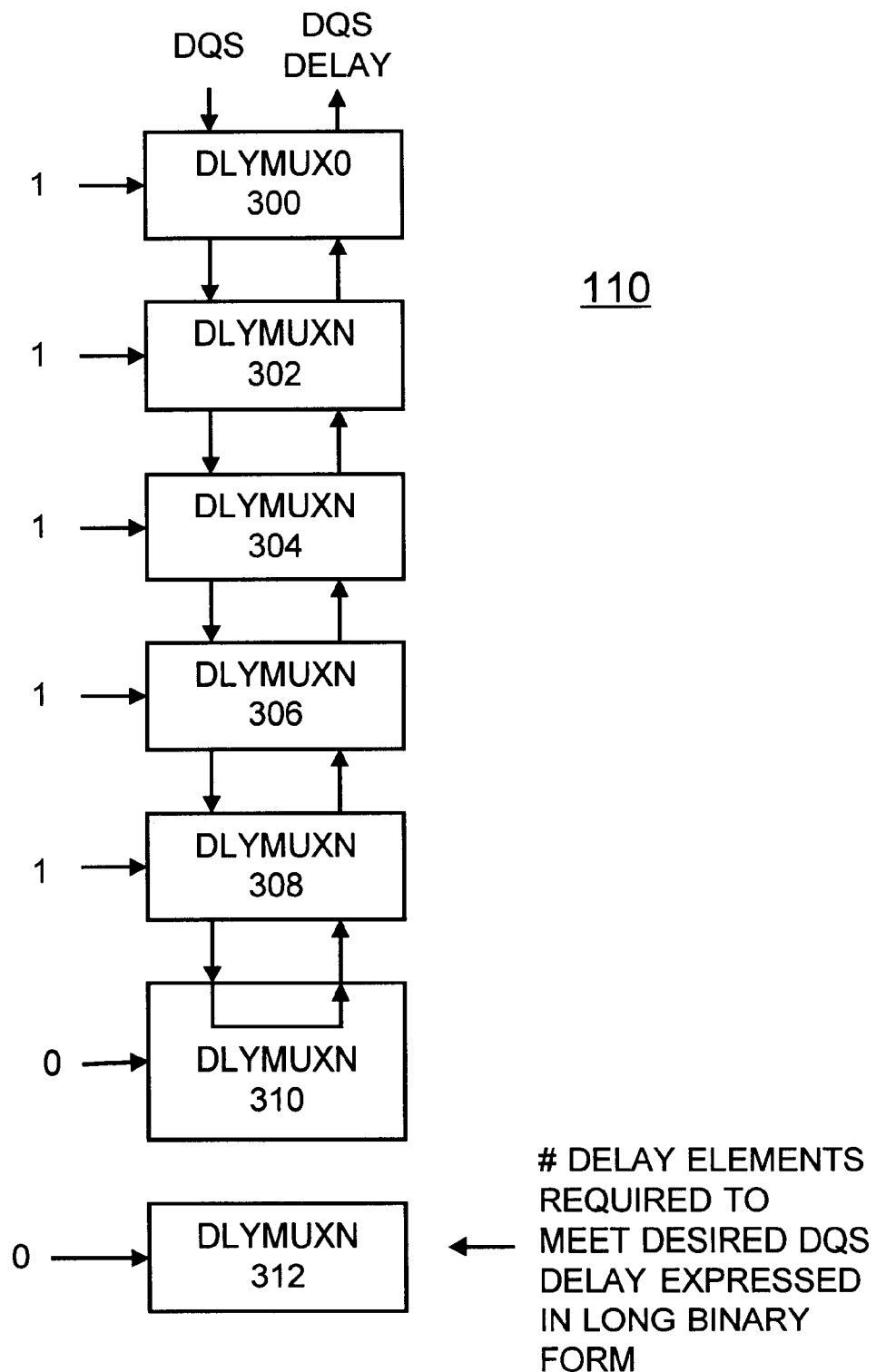
FIG. 3 is a block diagram representation illustrating a DSQ delay circuit of the programmable compensated delay apparatus of FIG. 1 in accordance with the preferred embodiment.

Referring also to FIG. 3, there is shown a block diagram representation illustrating the actual DSQ delay circuit 110 of the programmable compensated delay apparatus 100 in accordance with the preferred embodiment. DSQ delay circuit 110 includes a chain of a plurality of delay elements 300, 302, 304, 306, 308, 310, 312 required to meet a desired DQS delay, expressed in long binary form. As shown, delay multiplexers (muxes) are used for the delay elements 300, 302, 304, 306, 308, 310, 312. The last delay element in the chain is the first mux with its input control set to 0 so that its forward input is routed to its return output, such as mux 310 as shown in FIG. 3. This last delay element 310 has a delay of one-half the delay of the other delay elements 300, 302, 304, 306, 308. The number of delay elements or muxes 300, 302, 304, 306, 308 in the actual delay chain is measured to be the number of delay elements or muxes 300, 302, 304, 306, 308 with their control set to 1 so that their return output is fed by their return input. The DQS delay control value output of register 108 is used to determine how many delay elements or muxes 300, 302, 304, 306, 308, 310, 312 should have their control set to 1 in the DQS delay chain 110 to achieve the desired delay.

Figure 4:
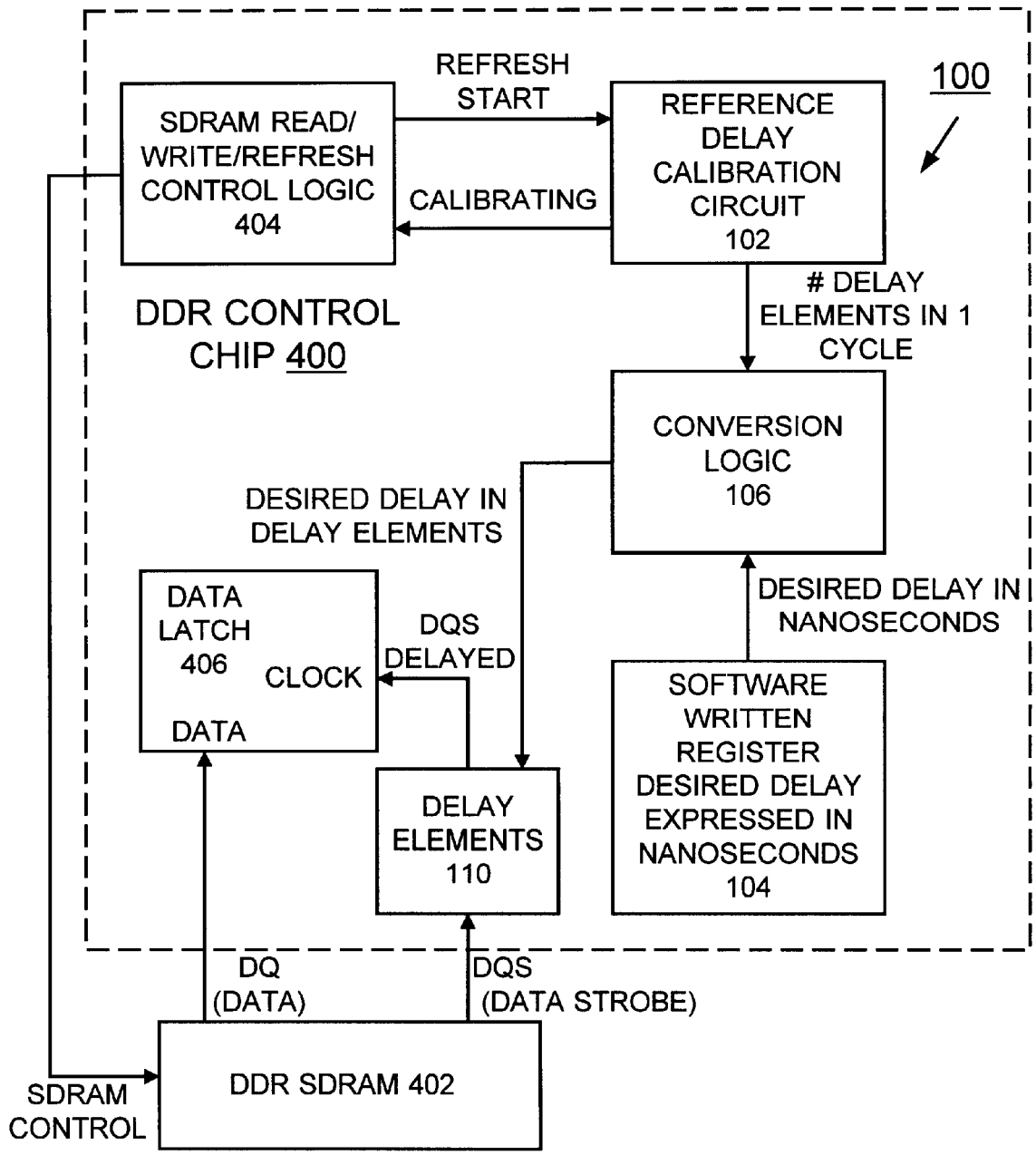
FIG. 4 is a block diagram representation illustrating DDR control chip including the programmable compensated delay apparatus of FIG. 1 together with a DDR SDRAM in accordance with the preferred embodiment.

FIG. 4 is a block diagram representation illustrating DDR control chip 400 including the programmable compensated delay apparatus 100 together with a DDR SDRAM 402 in accordance with the preferred embodiment. DDR control chip 400 includes a SDRAM read/write/refresh control logic 404 that provides a refresh start signal to the reference delay calibration circuit 102 of the programmable compensated delay apparatus 100. SDRAM read/write/refresh control logic 404 receives a calibrating signal from the reference delay calibration circuit 102. Calibration typically is performed in a few cycles, much less than the cycles required for refresh. The calibration signal provides a safety feature in the event that calibration is not completed before refresh. SDRAM read/write/refresh control logic 404 applies a SDRAM control signal to the DDR SDRAM 402. Reference delay calibration circuit 102 applies a number of delay elements in one cycle value to the conversion logic 106. Software written register 104 with the desired delay expressed in nanoseconds applies a desired delay in nanoseconds to the conversion logic 106. Conversion logic 106 applies a desired delay in delay elements to the delay elements 110. The DQS data strobe output of the DDR SDRAM 402 is applied to the delay elements 110. A DQS delayed signal output of the delay elements 110 is applied to a clock input of a data latch 406. The DQ data output of the DDR SDRAM 402 is applied to the data latch 406.

While the present invention has been described with reference to the details of the embodiments of the invention shown in the drawing, these details are not intended to limit the scope of the invention as claimed in the appended claims.

What is claimed is:

1. A programmable compensated delay apparatus comprising:
    a reference delay calibration circuit for providing a measured number of delay elements in one cycle; said reference delay calibration circuit including a start latch, an end latch and a delay chain of a programmable number of multiplexers;
    a programmable delay register for providing a desired delay value;
    a conversion logic coupled to said reference delay calibration circuit and said programmable delay register for receiving both said measured number of delay elements in one cycle and said desired delay value; said conversion logic for providing a number of required delay elements; and
    a delay circuit coupled to said conversion logic for receiving said number of required delay elements and providing said desired delay.

2. A programmable compensated delay apparatus as recited in claim 1 wherein said delay circuit includes a chain of a plurality of delay elements.

3. A programmable compensated delay apparatus as recited in claim 2 wherein said chain of a plurality of delay elements include a plurality of multiplexers; a last delay element in said chain is a first multiplexer having an input control set to zero, whereby a forward input is routed to a return output of said first multiplexer.

4. A programmable compensated delay apparatus as recited in claim 1 wherein said delay circuit receives a DQS clock strobe on a double data rate (DDR) synchronous dynamic random access memory (SDRAM) and said DQS clock strobe is delayed by said desired delay.

5. A programmable compensated delay apparatus as recited in claim 4 wherein said programmable delay register is a software written register.

6. A programmable compensated delay apparatus as recited in claim 1 wherein said programmable delay register is written by software at power-on initialization.

7. A programmable compensated delay apparatus as recited in claim 1 wherein said programmable number of multiplexers in said chain is set by adding a delay element each cycle until that when a one is latched in said start latch until a zero is latched in said end latch one cycle later.

8. A programmable compensated delay apparatus as recited in claim 7 further includes removing a delay element each cycle until a one is latched in said end latch one cycle after a one is latched in said start latch.

9. A programmable compensated delay apparatus as recited in claim 8 wherein said reference delay calibration circuit provides said measured number of delay elements in one cycle responsive to said one latched in said end latch one cycle after a one is latched in said start latch.

10. A programmable compensated delay apparatus as recited in claim 1 wherein said conversion logic receives said measured number of delay elements in one cycle and said desired delay value; said conversion logic further utilizes a predefined delay value for additional delay in said reference delay calibration circuit for providing a number of required delay elements for said delay circuit.

11. A programmable compensated delay apparatus as recited in claim 1 wherein said conversion logic includes a control register; said number of required delay elements for said delay circuit is latched into said control register.

12. A programmable compensated delay apparatus for a double data rate (DDR) synchronous dynamic random access memory (SDRAM) interface comprising:
    a reference delay calibration circuit for providing a measured number of delay elements in one cycle; said reference delay calibration circuit including a start latch, an end latch and a delay chain of a programmable number of multiplexers;
    a SDRAM control logic coupled to said reference delay calibration circuit for providing a refresh start signal to said reference delay calibration circuit for updating said measured number of delay elements in one cycle during each DDRAM refresh;
    a programmable delay register for providing a desired delay value;
    a conversion logic coupled to said reference delay calibration circuit and said programmable delay register for receiving both said measured number of delay elements in one cycle and said desired delay value; said conversion logic for providing a number of required delay elements; and
    a delay circuit coupled to said conversion logic for receiving said number of required delay elements and a DQS clock strobe and for providing said DQS clock strobe delayed by said desired delay.

13. A programmable compensated delay apparatus for a double data rate (DDR) synchronous dynamic random access memory (SDRAM) interface as recited in claim 12 wherein said programmable number of multiplexers in said chain is set by adding a delay element each cycle until that when a one is latched in said start latch, a zero is latched in said end latch one cycle later.

14. A programmable compensated delay apparatus for a double data rate (DDR) synchronous dynamic random access memory (SDRAM) interface as recited in claim 13 further includes removing a delay element each cycle until a one is latched in said end latch one cycle after a one is latched in said start latch.

15. A programmable compensated delay apparatus for a double data rate (DDR) synchronous dynamic random access memory (SDRAM) interface as recited in claim 14 wherein said reference delay calibration circuit provides said measured number of delay elements in one cycle responsive to said one latched in said end latch one cycle after a one is latched in said start latch.

16. A programmable compensated delay apparatus for a double data rate (DDR) synchronous dynamic random access memory (SDRAM) interface as recited in claim 12 wherein said programmable delay register is written by software at power-on initialization.

* * * * *